United States Patent [19]

Sheehan et al.

[11] Patent Number: 4,548,214

[45] Date of Patent: Oct. 22, 1985

[54] FORE-AND-AFT LEVELING MECHANISM FOR COMBINE CLEANING APPARATUS

[75] Inventors: Ronald T. Sheehan; Myles Hyman, both of Lancaster, Pa.

[73] Assignee: Sperry Corporation, New Holland, Pa.

[21] Appl. No.: 659,933

[22] Filed: Oct. 11, 1984

[51] Int. Cl.$^4$ .............................................. A01F 12/30
[52] U.S. Cl. ................................ 130/27 AE; 130/24; 56/10.2; 56/209
[58] Field of Search ............... 56/10.2, 209, 210, 212, 56/DIG. 5, DIG. 10, DIG. 15; 130/27 AE, 24, 25, 27 Z; 209/416

[56] References Cited

U.S. PATENT DOCUMENTS

| | | | |
|---|---|---|---|
| 366,242 | 7/1887 | Parnell | 130/27 AE |
| 1,064,440 | 6/1913 | Brown | 130/27 AE |
| 2,351,567 | 6/1944 | Welty | 130/24 |
| 2,691,444 | 10/1954 | Oliver | 130/27 AE |
| 3,269,685 | 8/1966 | Wallace | 56/210 |
| 4,344,443 | 8/1982 | De Busscher et al. | 130/27 Z |

FOREIGN PATENT DOCUMENTS 1313802  4/1973  United Kingdom .

Primary Examiner—John J. Wilson
Assistant Examiner—John G. Weiss
Attorney, Agent, or Firm—Larry W. Miller; Frank A. Seemar; Darrell F. Marquette

[57] ABSTRACT

A cleaning apparatus for a combine harvester is disclosed wherein the grain pan and sieves are mounted in a shaker shoe pivotally supported on the main frame of the combine for movement about a transversely extending axis. Hydraulic actuators interconnecting the main frame and the shaker shoe affect a pivotal movement of the shaker shoe to level the cleaning apparatus under conditions where the combine has an inclined fore-and-aft orientation. An inclinometer is utilized to control the flow of hydraulic fluid to the hydraulic actuators to permit the shaker shoe to be leveled in response to a sensing of a non-horizontal fore-and-aft inclination by the inclinometer.

12 Claims, 4 Drawing Figures

FORE-AND-AFT LEVELING MECHANISM FOR COMBINE CLEANING APPARATUS

BACKGROUND OF THE INVENTION

The present invention relates generally to combine harvesters and, more particularly, to improvements in the cleaning apparatus to permit a fore-and-aft leveling thereof when the combine is operating under fore-and-aft inclined operating conditions.

The operation of combine harvesters under non-horizontal conditions is somewhat less efficient than the operation of the combine on generally level ground because of the gravity induced movement of threshed grain in a downhill direction on the cleaning apparatus. This gravity induced movement creates an unbalanced loading of the cleaning mechanism and prevents a proper flow of air from a cleaning fan through the threshed grain on the sieves to facilitate a removal of chaff and other debris. A fore-and-aft inclination of the sieves will result in the threshed grain being either retarded on the sieves or rushed toward the rearward end, which results in improper cleaning action and/or high grain losses.

Attempts to maintain a combine cleaning apparatus in a horizontal orientation while the combine is operating under sidehill conditions can be found in U.S. Pat. No. 3,731,470 granted to G. K. Cornish et al on May 8, 1973, and in U.S. Pat. No. 4,344,443 granted to C. R. J. DeBusscher on Aug. 17, 1982. The apparatus disclosed in the Cornish patent provides a leveling of the entire frame of the combine through the operation of hydraulic cylinders to maintain the cleaning apparatus in a generally horizontal orientation. Since the entire combine is maintained in a level orientation, it was necessary to modify the connection of the crop harvesting header to the combine to permit a proper gathering of the crop material to be harvested. The apparatus disclosed in the DeBusscher patent provides for a leveling of the entire cleaning mechanism, including the fan, about a longitudinally extending pivot axis; however, the DeBusscher mechanism does not provide for fore-and-aft leveling of the cleaning apparatus. Furthermore, the DeBusscher mechanism is expensive to manufacture, is cumbersome to operate and results in an unnecessary shifting of major structural components.

SUMMARY OF THE INVENTION

It is an object of this invention to overcome the aforementioned disadvantages of the prior art by providing a fore-and-aft leveling mechanism for the cleaning apparatus in a combine harvester.

It is another object of this invention to pivotally support a shaker shoe mounting a grain pan and sieve mechanism for a generally fore-and-aft reciprocating movement such that the shaker shoe can be pivotally moved about a transversely extending axis.

It is an advantage of this invention that the efficiency of operation of the combine cleaning mechanism is increased under hillside operating conditions.

It is a feature of this invention that the pivotally mounted shaker shoe can be connected to an eccentric drive to affect a generally fore-and-aft shaking action to convey grain thereon in a rearward direction and facilitate the cleaning of threshed grain on the sieve mechanism.

It is still another object of this invention to maximize the operating efficiency of the cleaning mechanism in a combine harvester by pivotally leveling the grain pan and chaffer sieve in a fore-and-aft direction when operating under hillside operating conditions.

It is still another object of this invention to reciprocatably support a lower cleaning sieve from a shaker shoe pivotally mounted on the main frame for movement about a transversely extending axis.

It is another feature of this invention that a connecting link interconnecting the shaker shoe and the lower cleaning sieve to a frame mounting point telescopes to permit the shaker shoe to be pivotally moved relative to the lower cleaning sieve.

It is still another feature of this invention that only the grain pan and chaffer sieve are pivotally moved to minimize the weight of structural elements pivotally supported for movement relative to the main frame of the combine.

It is yet another object of this invention to control the fore-and-aft leveling of the cleaning mechanism automatically without the need for operator input.

It is yet another feature of this invention that the cleaning apparatus leveling mechanism is operatively connected to an inclinometer for automatically controlling the leveling movement in response to the sensing of a fore-and-aft inclination of the main frame.

It is a further object of this invention to provide a fore-and-aft leveling mechanism for the cleaning mechanism of a combine harvester which is durable in construction, inexpensive of manufacture, carefree of maintenance, facile in assemblage, and simple and effective in use.

These and other objects, features and advantages are accomplished according to the instant invention by providing a cleaning apparatus for a combine harvester wherein the grain pan and sieves are mounted in a shaker shoe pivotally supported on the main frame of the combine for movement about a transversely extending axis. Hydraulic actuators interconnecting the main frame and the shaker shoe affect a pivotal movement of the shaker shoe to level the cleaning apparatus under conditions where the combine has an inclined fore-and-aft orientation. An inclinometer is utilized to control the flow of hydraulic fluid to the hydraulic actuators to permit the shaker shoe to be leveled in response to a sensing of a non-horizontal fore-and-aft inclination by the inclinometer.

BRIEF DESCRIPTION OF THE DRAWINGS

The advantages of this invention will become apparent upon consideration of the following detailed description of the invention, especially when taken in conjunction with the accompanying drawings wherein.

DETAILED DESCRIPTION OF THE PREFERRED EMBODIMENT

Figure 1:
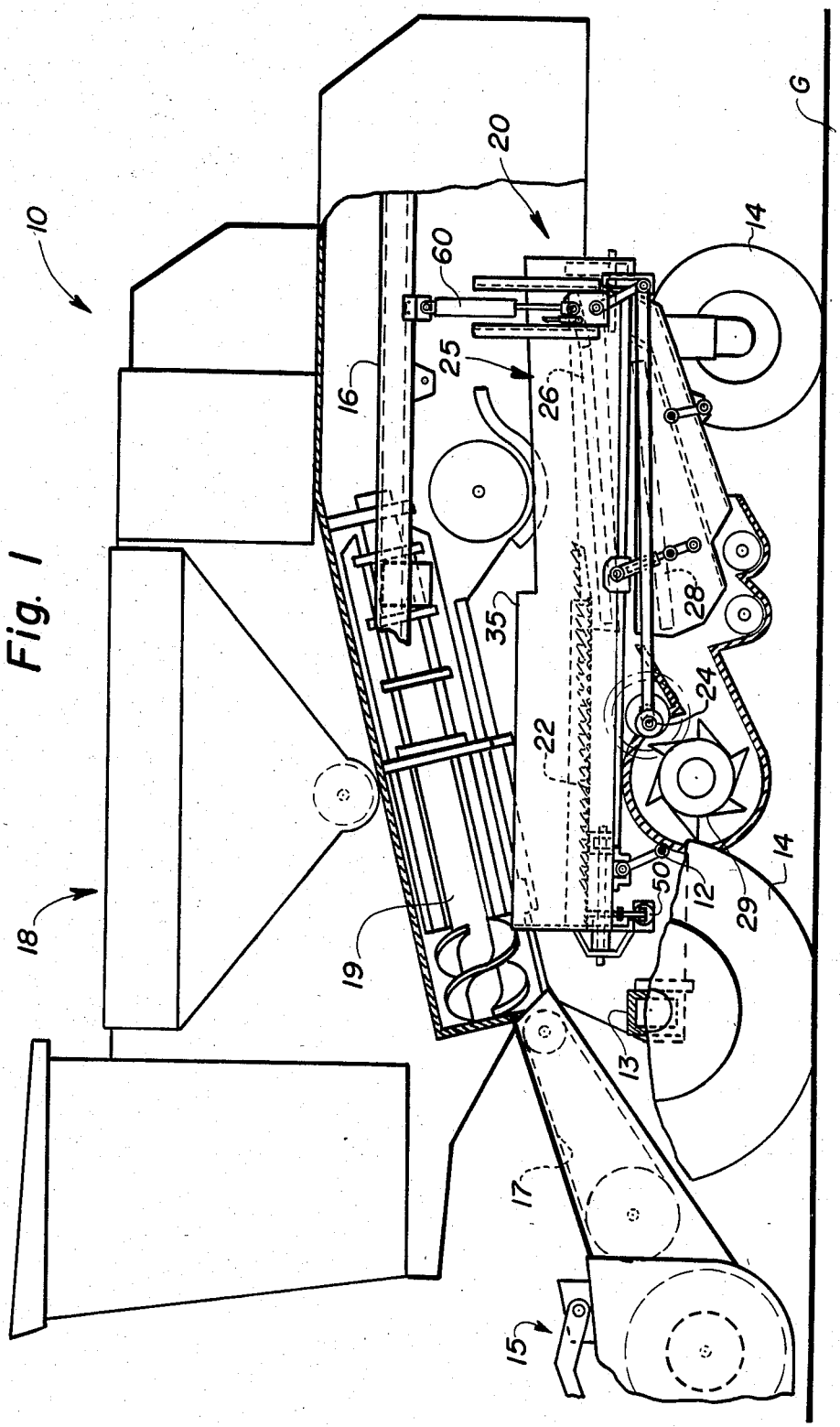
FIG. 1 is a side elevational view of a combine harvester incorporating the principles of the instant invention, portions of the side structure of the harvester being broken away to better show the invention.

Referring now to the drawings and, particularly, to FIG. 1, a side elevational view of a combine harvester incorporating the principles of the instant invention, can be seen. Any left and right references are as a matter of convenience and are determined by standing at the rear of the machine, facing the forward end, the direction of travel. The combine 10 is provided with a main frame 12 having at least one transversely disposed beam 13 mobilely supported over the ground G by wheels 14. A crop harvesting header 15 is forwardly supported from the frame 12 to gather crop material and convey it rearwardly via a feeding mechanism 17 to a threshed and separating mechanism 19. The threshing and separating mechanism 19 is operable to thresh the crop material fed thereto and separate the threshed grain from the trash material to precipitate the threshed grain downwardly through the threshing and separating mechanism 19 and to discharge the trash material along a separate path to be deposited on the ground G rearward of the combine 10.

A cleaning mechanism 20 is positioned beneath the threshing and separating mechanism 19 to receive the threshed grain precipitated therefrom on a grain pan 22. Generally, the cleaning mechanism 20 is operatively connected to an eccentric drive 24 to affect a generally fore-and-aft reciprocating movement of the cleaning mechanism 20 to convey the thresh grain in a rearward direction. A sieve means 25 is positioned rearwardly of the grain pan 22 to receive threshed grain conveyed rearwardly therefrom and clean the threshed grain from chaff and other debris conveyed therewith. Typically, the sieve means 25 includes an upper chaffer sieve 26 and a lower cleaning sieve mounted for opposing fore-and-aft reciprocating movement and in flow communication with air being blown from a fan 29 upwardly through the sieves 26,28 to remove chaff and debris from the threshed grain. Cleaned grain passing through the sieve means 25 is conveyed into a storage tank 18 supported on the main frame 12.

Figure 2:
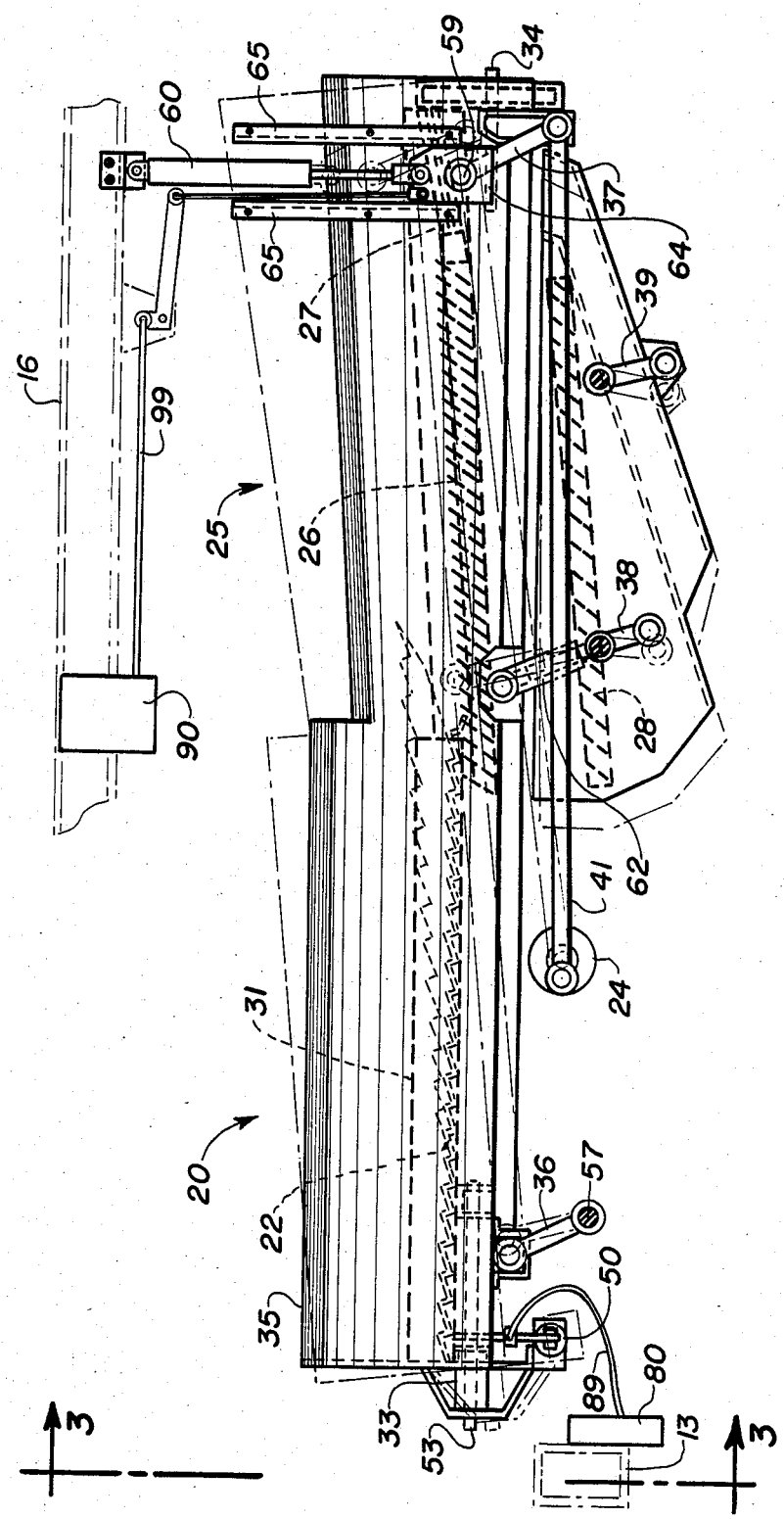
FIG. 2 is an enlarged partial cross sectional view of the cleaning apparatus seen in FIG. 1, the reciprocating movement of the cleaning apparatus being indicated by the phantom position of the lower cleaning sieve, the pivotal movement of the shaker shoe about a forwardly disposed transverse pivotal axis also being shown in phantom.
Figure 3:
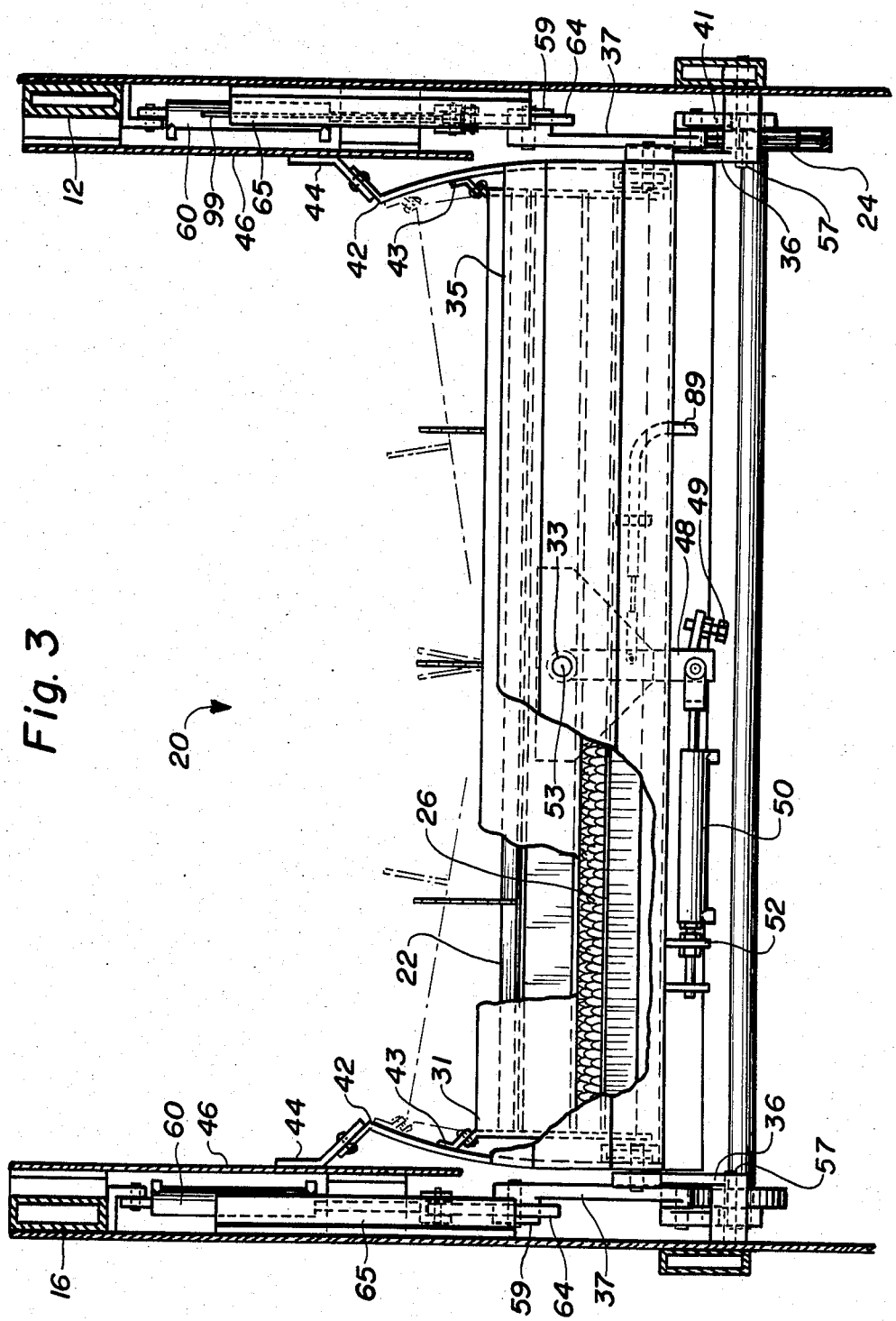
FIG. 3 is a partial cross-sectional end view of the cleaning apparatus shown in FIG. 2 as seen in the direction indicated by lines 3—3, the pivotal movement of a subframe pivotally mounting the grain pan and chaffer sieve about a longitudinally extending pivotal axis being shown in phantom.

Referring now to FIGS. 2 and 3, the details of the leveling mechanism can best be seen. The grain pan 22 and chaffer sieve 26 are mounted in a subframe 31 which in turn is pivotally supported by fore-and-aft extending and longitudinally spaced pivots 33,34 within a shaker shoe 35. A tailings return section 27 is positioned at the rear of the chaffer sieve 26 and is pivotally movable therewith. The tailings return section 27 is cooperable with conventional apparatus with return of unthreshed heads to the threshing and separating means 19. The shaker shoe 35 is pivotally supported from the frame 12 by a front connecting links 36, a rearward connecting links 37, and a central connecting links 38.

Each of the connecting links 36,37,38 incorporate rubber bushings in a conventional manner to permit a fore-and-aft reciprocating movement induced by a drive arm 41 interconnecting the eccentric drive 24 and the rearward link 37 supporting the shaker shoe 35. The lower cleaning sieve 28 is supported from the frame 12 by the central connecting links 38 and a supplemental connecting links 39 in a similar manner to permit a fore-and-aft reciprocating movement. By utilizing the center connecting links 38 with a frame mounting point intermediate the connection between the shaker shoe 35 and the lower cleaning sieve 28, the shaker shoe 35 and lower sieve 28 are drivingly reciprocated in opposing fore-and-aft directions in a manner conventionally known by one skilled in the art.

The shaker shoe 35 is provided with inwardly directed arcuate side members 42 to permit a sealing cooperation with longitudinally extending seals 43 connected to the subframe 31 and sweepingly engaging the inside of the arcuate side members 42 during pivotal movement of the subframe 31 relative to the shaker shoe 35. Additional longitudinally extending seals 44 are connected to the side members 42 of the shaker shoe 35 to sealingly engage vertically extending sidewalls 46 of the combine 10 to prevent the loss of threshed grain between the shaker shoe 35 and the sidewalls 46.

The subframe 31 is provided with a downwardly extending actuating arm 48. A hydraulic cylinder 50 interconnects a mounting tab 52 connected to the shaker shoe 35 and the actuating arm 48 for the pivotal movement of the subframe 35 about a fore-and-aft extending axis 53 defined by the front and back pivots 33,34. An adjustable stop bolt 49 engageable with the shaker shoe 35 serves as a limit to the amount of pivotal movement permitted to the subframe 31 in one direction, while the end of the retraction stroke of the cylinder 50 limits the movement of the subframe 31 in the opposing direction. The hydraulic cylinder 50 is operatively associated with a hydraulic system 70, described in greater detail relative to FIG. 4 below, to provide a flow of hydraulic fluid under pressure for operation of the cylinder 50.

The shaker shoe 35 is also mounted for pivotal movement about a transversely extending axis 57 corresponding to the frame mounting points of the front connecting links 36. The frame mounting point 59 for the rearward connecting links 37 is movably supported from a pair of transversely spaced hydraulic cylinders 60 to affect a fore-and-aft leveling movement of the shaker shoe 35, and consequently the grain pan 22 and chaffer sieve 26, through a pivotal movement of the shaker shoe 35 about the forwardly disposed transverse pivot axis 57 by raising and lowering the rearward end of the shaker shoe 35. To accommodate the pivotal movement of the shaker shoe 35 about the transverse axis 57, the center connecting links 38 include a telescoping portion 62, permitting a relative vertical movement between the chaffer sieve 26 and the lower cleaning sieve 28. To restrict any fore-and-aft movement of the frame mounting points 59 and thereby provide a proper fore-and-aft reciprocating movement induced by the eccentric drive 24, the frame mounting points 59 are housed in plates 64 positioned within generally vertically extending guides 65 to guide the movement of the plates 64.

Figure 4:
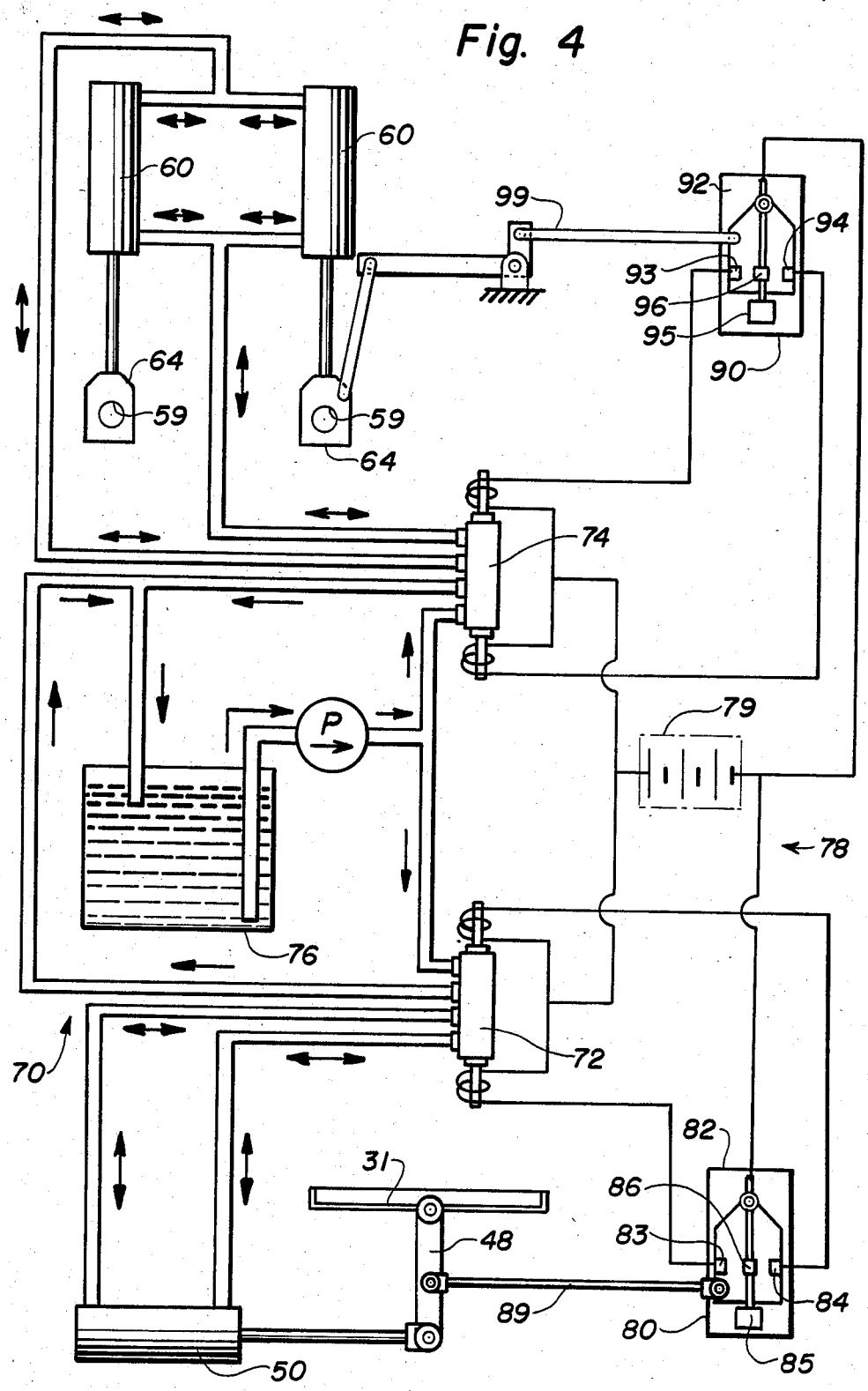
FIG. 4 is a schematic view depicting the hydraulic and electrical circuitry for pivotally moving the cleaning apparatus to obtain both fore-and-aft and laterally level orientations.

Referring now to the schematic diagram of FIG. 4 and the cross-sectional views of FIGS. 2 and 3, it can be seen that the hydraulic cylinders 50,60 are operably associated with the hydraulic system 70. A first solenoid valve 72 controls the direction of hydraulic fluid flow to the hydraulic cylinder 50, while a second solenoid valve 74 controls the flow of hydraulic fluid to the hydraulic cylinders 60. The solenoid valves 72,74 can be positioned to direct fluid to the respective hydraulic cylinders for either extension or retraction thereof or to circular fluid back to the reservoir 76 without affecting any movement of the hydraulic cylinders 50,60. The positioning of the solenoid valves 72,74 is controlled through an electrical circuit 78 connected to a battery 79 serving as a source of electrical power and to a pair of inclinometers 80,90.

Each inclinometer 80,90 includes a master member 82,92 having a first electrical contact 83,93 and a spaced apart second electrical contact 84,94. A pendulum 85,95 is pivotally mounted within the respective master member 82,92 for movement with the force of gravity relative to the master member 82,92. The pendulum 85,95 carries a third electrical contact 86,96 engageable with the respective first and second contacts to close the electrical circuit 78 and send a flow of electrical current from the battery 79 to the respective solenoid valve 72,74 as described in greater detail below. The position of the master members 82,92 relative to the main frame 12 is controlled through control links 89,99 in a manner also further described below.

The lateral inclinometer 80 is mounted on a transversely extending beam 13 forming a part of the main frame 12. As the combine 10 encounters side hill operating conditions, the transverse beam 13 becomes inclined to the horizontal; however, the pendulum 85 follows the force of gravity and moves relative to the master member 82. Sufficient lateral inclination of the combine 10 will cause the third contact 86 to engage either the first or second contacts 83,84 to close the electrical circuit and direct a flow of hydraulic fluid to the hydraulic cylinder 50, which in turn affects a pivotal movement of the subframe 31 to move the subframe 31 toward a level orientation relative to the main frame 12. The corresponding movement of the actuating arm 48 pulls on the control link 89 to cause a movement of the master member 82 relative to pendulum 85 until the electrical contact 86 on the pendulum 85 breaks engagement with the respective contact 83 or 84 on the master member 82. As a result, the solenoid valve 72 is permitted to return to a neutral position thereby locking the hydraulic cylinder at the position to which it has been moved. Subsequent changes in the lateral inclination of the combine 10 results in a similar operation to affect a movement of the subframe 31 in one direction or another with the subframe 31 always seeking a level orientation.

The operation of the hydraulic system 70 to control the fore-and-aft leveling operation is similar to the lateral leveling mechanism described above. A longitudinal inclinometer 90 is mounted on a fore-and-aft extending frame member to sense the inclination threof in a manner similar to that described above for the lateral inclinometer. Movement of the pedulum 95 relative to the master member 92 is induced by the force of gravity and affects an engagement of the third contact member 96 with one of the first or second contacts 93,94. The result is a closing of the electrical circuit 78 to energize the solenoid valve 74 and direct the flow of hydraulic fluid to the hydraulic cylinder 60 to cause a pivotal movement of the shaker shoe 35 about the transverse pivot axis 57. The movement of the plate 64 housing the rearward frame pivots 59 causes the control linkage 99 to move the master member 92 relative to the longitudinal frame member 16 and the pendulum 95 until the electrical circuit 78 is broken and the shaker shoe 35 has attained a generally horizontal fore-and-aft orientation. One skilled in the art will readily realize that an operation of the fore-and-aft and lateral leveling mechanisms described above will result in a maintenance of the grain pan 22 and chaffer sieve 26 in a generally horizontal orientation in both the fore-and-aft and transverse directions irrespective of the actual orientation of the main frame 12 when the combine 10 is operating uphill, downhill or on sidehills in either direction. Further description of the construction and operation of the above-described control mechanism can be found in co-pending U.S. patent application entitled "Lateral Leveling Mechanism for Combine Cleaning Apparatus" and given Ser. No. 659,932, the description of which is incorporated herein by reference.

It will be understood that changes in the details, materials, steps and arrangements of parts which have been described and illustrated to explain the nature of the invention will occur and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a combine harvester having a mobile main frame; threshing and separating means supported by said main frame to thresh crop material fed thereto and to separate threshed grain from trash residue, said threshing and separating means being operable to convey threshed grain for further harvesting treatment and to discharge the crop residue along a path separate from said threshed grain; cleaning means supported by said main frame in flow communication with said threshing and separating means to receive threshed grain therefrom and clean debris from said threshed grain, said cleaning means having first sieve means operable to permit the passage of cleaned grain therethrough, a fan operable to blow air through said first sieve means to facilitate the removal of debris from said threshed grain, a grain pan positioned to receive threshed grain from said threshing and separating means, and conveying means to convey said threshed grain from said grain pan to said first sieve means; and drive means for powering the operation of said threshing and separating means and said cleaning means, the improvement comprising:

a shaker shoe having first and second longitudinally spaced ends and mounting said grain pan and said first sieve means for movement in a generally fore-and-aft direction, said shaker shoe being pivotally supported at one of said ends by said main frame about a transversely extending pivot axis, the other said end being generally vertically movable about said pivot axis;

a second sieve means positioned below said first sieve means to receive cleaned grain therefrom and subject said cleaned grain to further cleaning action, said second sieve means being mounted for a generally fore-and-aft movement in opposition to the movement of said first sieve means by two sets of connecting links, one of said sets of connecting links being connected to said shaker shoe on the opposing side of the pivotal connection to said main frame to drive said second sieve means in the opposing direction to said shaker shoe; and an actuator interconnecting said main frame and said other end of said shaker shoe to effect a selective movement of said other shaker shoe end about said pivot axis.

2. The combine harvester of claim 1 further comprising control means operable to sense the fore-and-aft inclination of said main frame and control a corresponding operation of said actuator to maintain a fore-and-aft level attitude of said shaker shoe.

3. The combine harvester of claim 2 wherein said control means includes an inclinometer mounted on a fore-and-aft extending portion of said main frame and operable to sense a fore-and-aft inclination of said main frame.

4. The combine harvester of claim 3 wherein said actuator is a hydraulic cylinder connected to a hydraulic system having a solenoid valve operably connected to said inclinometer, said solenoid valve being actuated to control the flow of hydraulic fluid to said hydraulic cylinder in response to said inclinometer sensing a change in said fore-and-aft inclination of said main frame.

5. The combine harvester of claim 4 wherein the one set of connecting links interconnecting said shaker shoe and said second sieve means permits a relative movement between said shaker shoe and the pivotal connection of said one set of connecting links to said main frame.

6. The combine harvester of claim 5 wherein said one set of connecting links includes a telescoping portion between said shaker shoe and the pivotal connection with said main frame to permit a relative movement therebetween.

7. The combine harvester of claim 4 wherein said hydraulic cylinder is connected to the rearward end of said shaker shoe to effect a pivotal movement of said shaker shoe about said pivot axis positioned adjacent the forward end of said shaker shoe.

8. The combine harvester of claim 7 wherein said conveying means comprises an eccentric drive to provide a generally fore-and-aft shaking motion to said shaker shoe, said shaking motion having a vertical component.

9. The combine harvester of claim 8 wherein said rearward end of said shaker shoe is connected to a first pair of said connecting links, each of said first pair of connecting links having a connection end connected to said shaker shoe and a pivot end spaced from said connection end, said pivot end permitting said shaker shoe to move along a generally fore-and-aft direction relative to said connection end.

10. The combine harvester of claim 9 wherein said eccentric drive is connected to the connection end of said connecting links to effect said generally fore-and-aft shaking movement.

11. The combine harvester of claim 9 wherein said hydraulic cylinder is connected to the pivot end of said connecting links to effect a pivotal movement of said shaker shoe about said pivot axis.

12. The combine harvester of claim 11 wherein said actuator comprises a pair of hydraulic cylinders positioned adjacent corresponding transversely spaced sides of said shaker shoe.

* * * * *